Dec. 25, 1962 H. H. HAAS 3,070,672

ORDER WIRE AND ALARM CIRCUITS

Filed Oct. 9, 1961 6 Sheets-Sheet 1

INVENTOR
H. H. HAAS
BY Z. W. Adams, Jr.
ATTORNEY

Dec. 25, 1962 H. H. HAAS 3,070,672

ORDER WIRE AND ALARM CIRCUITS

Filed Oct. 9, 1961 6 Sheets-Sheet 2

FIG. 2 RADIO REPEATER

INVENTOR
H. H. HAAS
BY [signature]
ATTORNEY

INVENTOR
H. H. HAAS
BY [signature]
ATTORNEY

Dec. 25, 1962 H. H. HAAS 3,070,672

ORDER WIRE AND ALARM CIRCUITS

Filed Oct. 9, 1961 6 Sheets-Sheet 4

FIG. 4 ENCODER CIRCUIT

INVENTOR
H. H. HAAS
BY [signature]
ATTORNEY

Dec. 25, 1962 H. H. HAAS 3,070,672

ORDER WIRE AND ALARM CIRCUITS

Filed Oct. 9, 1961 6 Sheets-Sheet 5

INVENTOR
H. H. HAAS
BY [signature]
ATTORNEY

INVENTOR
H. H. HAAS
BY [signature]
ATTORNEY

United States Patent Office 3,070,672
Patented Dec. 25, 1962

3,070,672

ORDER WIRE AND ALARM CIRCUITS

Hammond H. Haas, Gillette, N.J., assignor to Bell Telephone Laboratories, Incorporated, New York, N.Y., a corporation of New York Filed Oct. 9, 1961, Ser. No. 143,789
4 Claims. (Cl. 179—175.31)

This invention relates to alarm circuits for radio communication systems and in particular to simplified alarm circuits for use in low-cost light route radio relay systems.

In any communication system utilizing unattended repeater stations and requiring a high degree of service reliability, it is necessary to have some way to monitor the performance of the unattended stations so that failures and service interruptions can be indicated. It is, of course, further desirable to place the unattended repeater stations along easily accessible routes, such as public highways, so that any failed station may be readily maintained.

However, when the unattended repeaters are placed along such routes, it is often found that the topography of the area will not permit line-of-sight communication without the use of high towers. Often times these towers are of such a height that obstruction lighting is required in accordance with Federal Aviation Agency regulations. These regulations additionally require the monitoring of the lights for maintenance purposes. It is, therefore, necessary to provide a means for monitoring the functioning of the tower lights and reporting the condition thereof to an attended station.

Additionally, when the unattended repeater stations are placed along such routes there is generally available along the same routes commercial alternating current power. Therefore, in the interest of economy it is advantageous to utilize this commercial power as a primary source at the unattended repeaters. However, in the event of a commercial power failure and because of the high degree of reliability required, it becomes necessary to provide a substitute power supply capable of maintaining service sufficiently long to permit corrective action to be taken. It is thus necessary to provide an alarm circuit in the system whereby a person at an attended station will be informed of any such power failure so that steps may be taken to maintain the system for the duration of an extended failure of primary power.

In such a communication system that has a plurality of unattended repeater stations it is desirable to provide a simple alarm system that will, without a great deal of complexity, monitor the repeater stations. These repeater stations may, as noted above, have a plurality of circuits that have to be monitored and the conditions thereof reported to an attendant at a main station over a single alarm channel. For example, Federal Aviation Agency requirements prescribe as obstruction lighting for very high towers the use of two top lights with means for flashing them on and off repetitively and side lights at some distance from the top. Additionally, it is required that the condition of these lights and flasher be monitored and any failure reported to an attended station. Further at these radio stations provision is often made for switching to stand-by direct current power upon the failure of the primary commercial alternating-current power source and for monitoring the operation of the diversity paths when more than one path is available between stations. Therefore, the failure of any of the tower lights must be recorded as well as the failure of the primary power source or of a diversity path. However, with the possibility of concurrent alarms where there is only a single alarm path, provision must be made to permit only one alarm at a time to be present on the alarm signaling channel.

It is also apparent that most of the trouble conditions will require the attendance of a technician at the radio station. However, at least one of these troubles may be self-correcting. For example, the primary power source or commercial alternating-current power may be restored and then it would not require the attendance of a technician at the radio station. Therefore, it is desirable to provide a means for informing the attendant at the alarm center of the clearing of the self-correcting troubles such as the restoration of the primary power source.

It is accordingly the object of this invention to provide an alarm circuit which is consistent with the economic requirements of a low-cost communication system, yet is adequate to account for system failures, primary power source failures, tower light failures and other selected possible failures while giving priority to the trouble condition of greatest importance and alerting an attendant of changed trouble conditions and the clearing of selected troubles.

In accordance with the invention, in a low-cost communication system that has a plurality of possible trouble conditions that have to be reported to an operator at a main station there is provided an alarm signaling channel forming a loop linking all of the subsidiary stations to the main station. Transmitting means at the main station impress a first signal to said loop, and means at the main station receive said signal from said loop. Means at each subsidiary station interrupt the loop in the event of trouble at the respective station. Additional means at the main station selectively apply to the loop signals having different frequencies individual to each subsidiary station and means at each subsidiary station bridge the loop for only the signal individual to that station. Further means are provided at each subsidiary station for interrupting the bridging means to produce codes associated with particular trouble conditions of differing ranks of importance. Means at each subsidiary station recognize the trouble condition of highest rank where a plurality of troubles exist concurrently so that only one code is generated at a time. Finally, means are provided for alerting an attendant at the main station of any change in code signal and trouble condition and for informing the attendant of the clearing of selected ones of the trouble conditions.

These and other features and advantages of the present invention will appear more clearly and fully upon consideration of the following specification taken in connection with the drawing in which.

Figure 1:
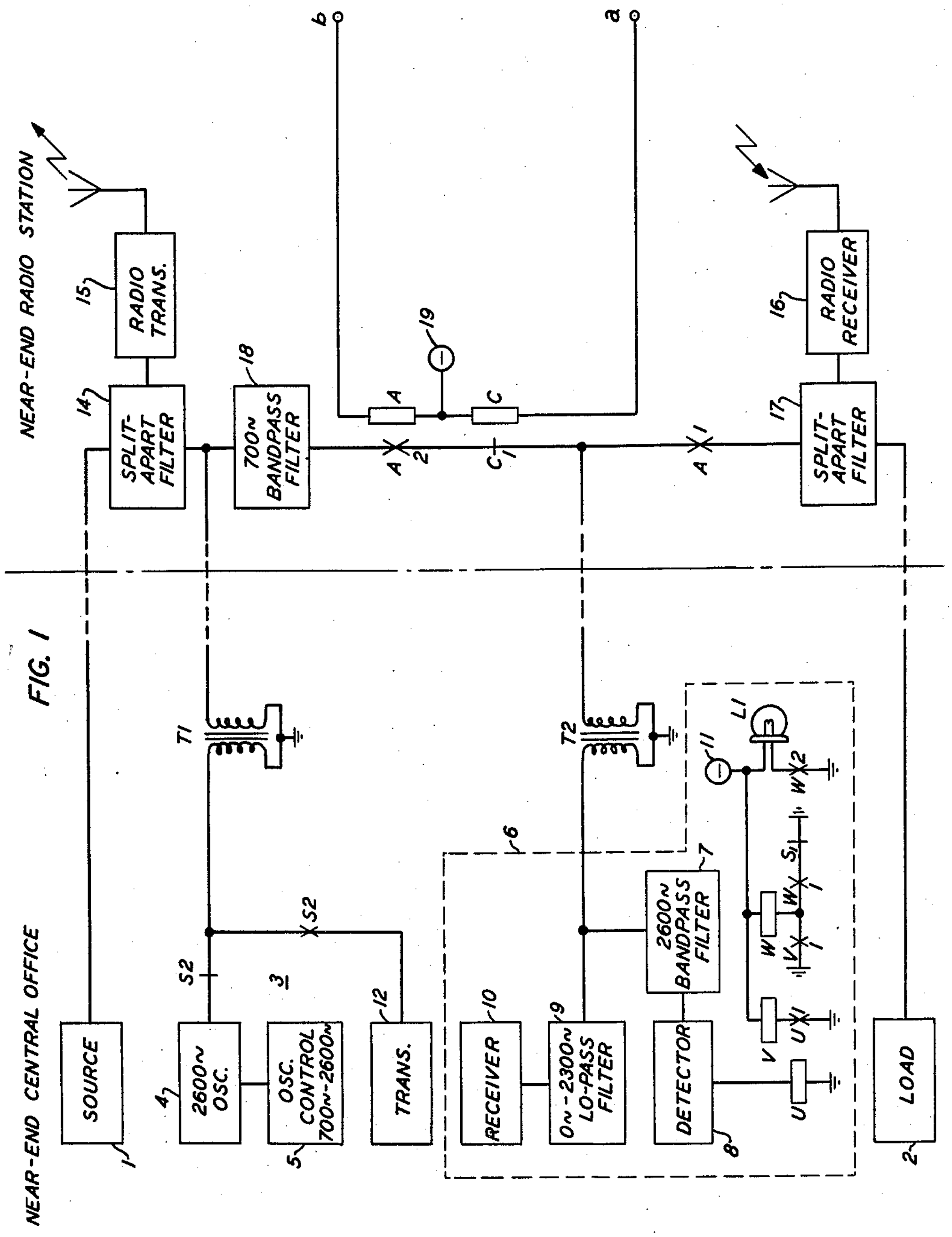
FIG. 1 is a diagram, partially in block form, illustrating the equipment provided according to the invention at an attended central office and at a first radio station associated therewith.

In the accompanying drawings, relay contacts are shown in detached form with an "X" indicating a make contact and a "|" indicating a break contact. Additionally, sequence charts are included in the drawings to explain more fully and clearly the operation of the circuits. The principles of this type of relay notation and of sequence charts for depicting the order of operation are described in an article entitled "An Improved Detached-Contact-Type of Schematic Circuit Drawing," by F. T. Meyer, in the September 1955 publication of the American Institute of Electrical Engineers Transactions, part I, vol. 74, pages 505–513.

Figure 2:
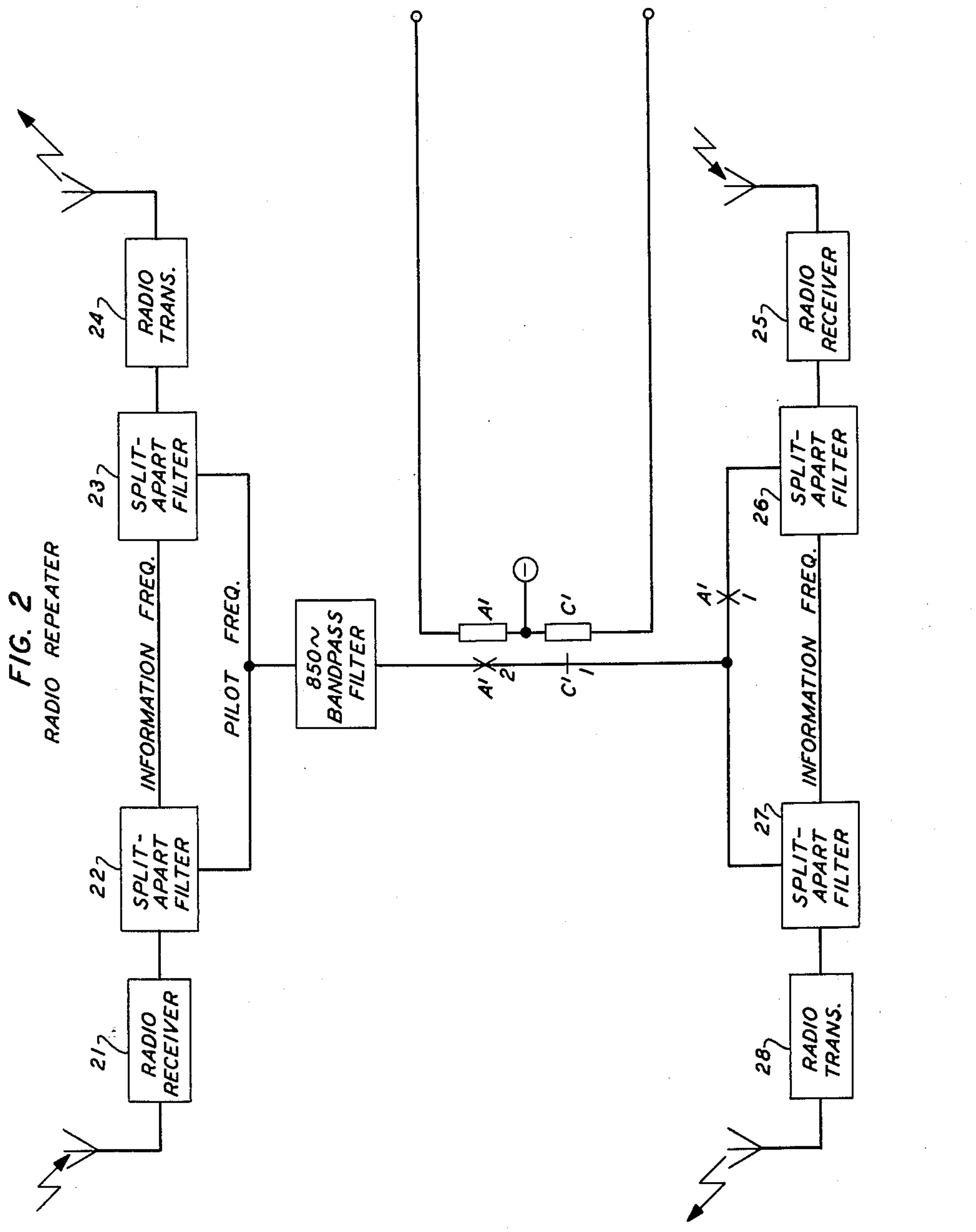
FIG. 2 is a diagram, partially in block form, illustrating the equipment provided according to the invention at a typical unattended repeater station.
Figure 3:
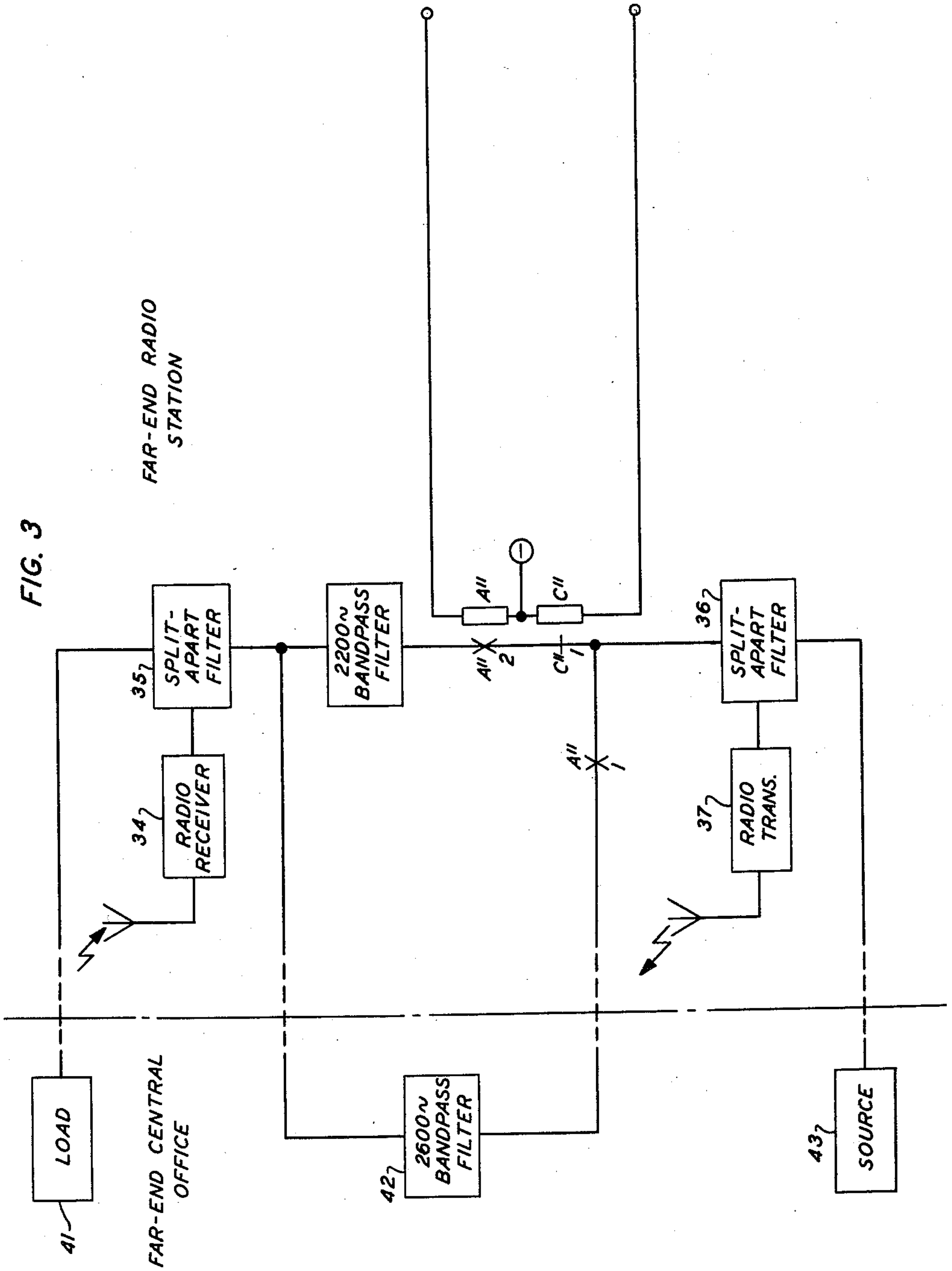
FIG. 3 is a diagram, partially in block form, illustrating the equipment provided according to the invention at a terminating radio station and associated terminating central office.

FIGS. 1, 2, and 3, taken together in the order given, illustrate a typical communication system employing unattended subsidiary or repeater stations and embodying the alarm circuit in accordance with the present invention. The communication system shown comprises a near-end central office, a near-end radio station, a radio repeater, a far-end radio station, and a far-end central office. The radio repeaters and the far-end central office are connected to the attended near-end central office by an alarm signaling channel which forms a loop which originates and ends at the near-end central office in FIG. 1 and is completed through the far-end central office in FIG. 3.

The message and information channels may originate at a point remote from the near-end central office or may, as shown in FIG. 1, have their origin at the attended central office as depicted by source 1 in FIG. 1. The information on the message channel, usually a multiplex message channel, combines with a signal transmitted over the alarm loop at the near-end radio station in the split-apart filter 14, which may be, for example, a hybrid network or a combination of bandpass filters. The combined signal is thereafter amplified and radiated by radio transmitter 15.

The signal transmitted from the near-end radio transmitter 15 is received by a radio receiver 21 in the radio repeater (FIG. 2). The combined signal passes to and is separated by split-apart filter 22, thereafter recombining in split-apart filter 23. The recombined signal is then amplified and reradiated by radio transmitter 24. After the comibned signal passes through any succeeding radio repeaters in the system, it is finally received by radio receiver 34 at the far-end radio station (FIG. 3). The signal is then passed to and separated by split-apart filter 35. The information signal thereafter passes to its utilization point, represented generally by load 41 in the far-end central office. This load may be located at a point remote from this central office but is shown here for illustrative purposes.

The alarm signal passes to the far-end central office where the alarm loop passes through bandpass filter 42. The alarm signal is thereafter returned to the attended central office of FIG. 1 by a similar path to complete the alarm loop. This path is through split-apart filter 36 at the far-end radio station where the signal combines with the information carrying signal originating at a remote point or at the far-end central office as depicted in FIG. 3 by source 43.

The combined signal passes through the split-apart filter 36 and is amplified and radiated to the adjacent repeaters by the radio transmitter 37. After the signal is passed through any intervening radio repeaters, it is received by the radio receiver 25 (FIG. 2) of the radio repeater adjacent to the near-end radio station. The combined signal is then passed to and separated by split-apart filter 26, thereafter recombining in split-apart filter 27 to be amplified and reradiated by radio transmitter 28. The signal is thereafter received at the near-end radio station (FIG. 1) by radio receiver 16 where it is to be amplified and passed on to split-apart filter 17. The information-carrying signal is separated in the split-apart filter 17 from the alarm signal and is passed on to its utilization point represented generally by load 2 in the near-end central office. The alarm signal completes its lop through the repeaters and far-end central office by passing from split-apart filter 17 to the near-end central office where it is monitored.

This alarm loop may have any discrete frequency signal applied thereto for alarm purposes, but, for illustrative purposes, the alarm system will be herein described as having normally impressed thereon a signal frequency of approximately 2600 cycles-per-second, with provision for applying, individually to the alarm loop, signals having frequencies between 700 and 2200 cycles-per-second. These signals, or pilot tones, originate at the near-end central office and are supplied by pilot tone source 3, comprising a 2600-cycle oscillator 4 and an oscillator control 5. These tones are carried by wire line through transformer $T_1$ to the near-end radio station where they are combined in the split-apart filter 14 with the information carrying signal as described above.

The pilot tone, upon completion of its transmission over the alarm loop, is coupled through transformer $T_2$ at the near-end central office, and is carried by wire line to the alarm loop terminating circuit 6 (FIG. 1). The terminating circuit 6 comprises a bandpass filter 7, detector 8, and related alarm indicating devices comprising relays U, V and W, switch $S_1$, and visual alarm lamp $L_1$. The terminating circuit 6 additionally comprises low-pass filter 9 and receiver 10.

Receiver 10 may be used to receive audible alarms over the alarm loop and also may be employed in conjunction with a transmitter 12 to communicate with a technician at an unattended station.

It is noted in tracing the alarm signaling loop through the radio stations that at the output of split-apart filters 17 and 26 of the near-end radio station and the radio repeater respectively, and at the input to split-apart filter 35 at the far-end radio station, the alarm signal travels through a make contact 1 of relays A, A′ and A″, respectively. Therefore, the opening of any one of these contacts 1 will open the alarm path and will effectuate an alarm at the alarm center or the near-end central office. Upon the interruption in the alarm loop the 2600 cycles-per-second pilot tone from oscillator 4 will be removed from detector 8 (FIG. 1). This absence of pilot tone will effect a change of state in the associated alarm indicating network to give a visual alarm.

A relay U is connected to the output of detector 8 and is arranged to become activated upon the removal of tone at the input to detector 8. A make contact 1 of relay U is connected in the energization path of a relay V so that upon the closing of make contact 1 of relay U relay V will become activated. Make contact 1 of relay U is connected between ground and one of the energization terminals of relay V, while the other side of relay V is connected directly to a power supply 11.

A make contact 1 of relay V is connected in parallel with a self-locking circuit between ground and one of the energization terminals of a relay W. Upon the closing of make contact 1 of relay V, relay W will become energized and will lock in the energized state through its own make contact 1. Make contact 1 of relay W is in series with a normally closed manual switch $S_1$. Switch $S_1$ is employed to determine whether the interruption in the alarm loop was only momentary or of extended duration.

A make contact 2 of relay W is in the energization path of a lamp $L_1$ so that upon the activation of relay W its make contact 2 will close, thereby causing lamp $L_1$ to light.

When the attendant at the near-end central office notes the lighting of the lamp, he will open switch $S_1$ in the locking circuit of relay W to determine whether the 2600-cycle tone is again present at the input to detector 8. If the tone is not present, lamp $L_1$ will remain lighted thereby indicating that there has been a failure in the transmission path of the alarm loop. However, if the lamp $L_1$ goes out, it will indicate that the 2600 cycle tone is again present and the interruption was only momentary as may be caused, for example, by a failure of a monitored circuit at one of the unattended stations. The fact that a failure of a particular monitored circuit at an unattended station will cause only a momentary interruption, which is sufficiently long to register the alarm at the attended station, will be more fully discussed in connection with the sequence charts of FIGS. 5 through 11.

As noted, the alarm loop is normally opened only long enough to energize the alarm lamp $L_1$ at the near-end central office so that any succeeding alarm at any of the other stations can be indicated. Once the alarm lamp $L_1$ lights, the attendant at the near-end central office may begin interrogating the unattended radio stations to determine the location and type of failure. The attendant may, for example, impress upon the alarm loop a 700-cycle tone which is associated with the near-end radio station by the action of bandpass filter 18. The 700-cycle signal will be bridged across the alarm loop at the near-end radio station through a bandpass filter 18, a make contact 2 of a relay A and a break contact 1 of a coding relay C. The interrogation tones associated with the radio repeaters and the far-end radio station will be similarly bridged across the alarm loop at these respective stations.

The radio stations may be located in an area where no radio tower is required. However, more often the lay of the land does not lend itself to line-of-sight communication without the use of high towers at some of the radio stations. For purposes of illustration, it will be assumed that the near-end radio station of FIG. 1, the radio repeater of FIG. 2 and the far-end radio station of FIG. 3 require high towers and, therefore, obstruction lighting in accordance with Federal Aviation Agency requirements. Under these circumstances a plurality of trouble conditions of different degrees of importance may exist and to provide for these, an encoder circuit as shown in FIG. 4 of the drawings may be connected to each of the radio stations involved.

As noted an encoder circuit may be connected to terminals *a* and *b* of each of the radio stations to provide means for ranking the trouble conditions in order of importance, thereby permitting an indication at the alarm center (the attended station) of only one alarm at a time. The encoder circuit additionally provides means for giving priority to the alarm of greatest importance, with additional means for alerting the attendant at the alarm center of any change in priority of alarm conditions and of the clearing out of selected ones of the trouble conditions.

Figure 4:
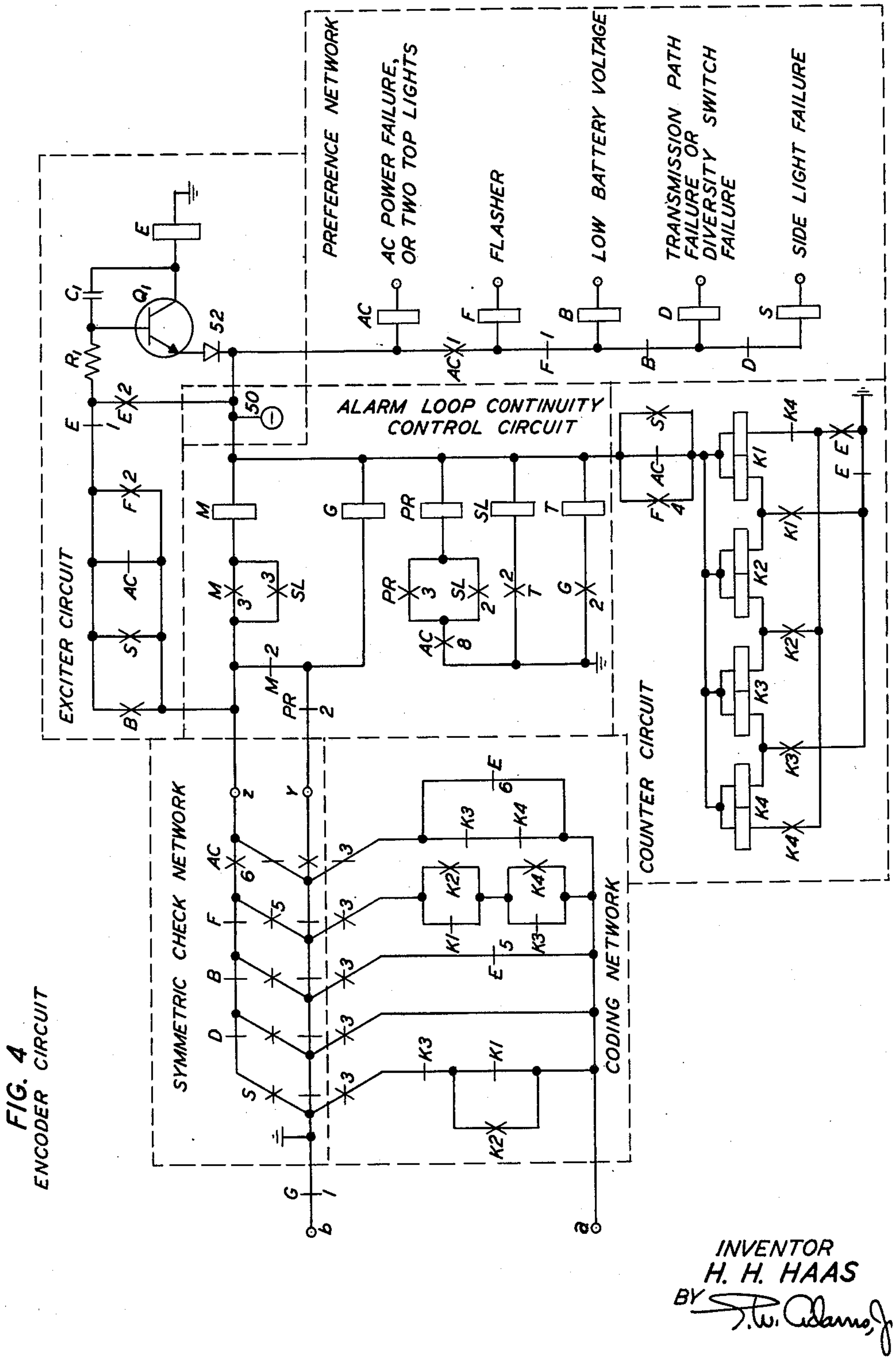
FIG. 4 is a schematic diagram of an encoder circuit, in accordance with the invention which may be utilized at the radio station of FIG. 1, the radio repeater of FIG. 2 and the radio station of FIG. 3.
Figure 5:
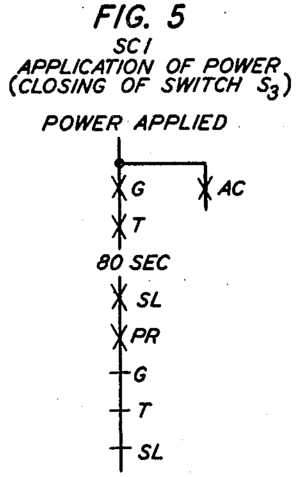
FIGS. 5 through 11 are sequence charts depicting the order of operation of the circuits in the encoder circuit shown in FIG. 4.

The connection of the encoder circuit of FIG. 4 to each of the radio stations will cause the continuity of the alarm loop to each radio station to be controlled by the encoder circuit through the control of relays A, A' and A'' at the respective stations. These relays are controlled by the encoder circuit so that their action coincides with particular trouble conditions to momentarily interrupt the alarm loop.

The continuity of the bridging circuits through make contact 2 of relays A, A' and A'' and break contact 1 of coding relays C, C' and C'' at the respective stations is also controlled by the associated encoder circuit of FIG. 4. Relay A at the near-end radio station of FIG. 1, for example, is connected through a terminal *b* to the encoder circuit of FIG. 4, where it passes through a break contact 1 of a relay G to ground. The other side of relay A is connected directly to a source 19. It is obvious then that the action of relay A will be controlled by the encoder circuit through the action of its relay G. Additionally in FIG. 1, one side of relay C is connected directly to source 19, while the other side is connected through terminal *a* to the encoder circuit of FIG. 4, wherein it is connected to ground through a coding network.

The encoder circuit of FIG. 4 consists of functional sections identified by the names "preference," "counter," "exciter," "symmetric check," "coding" and "alarm loop continuity control" circuits or networks. The encoder circuit will be described first by considering the functional sections and then considering the over-all operation with reference to the sequence charts of FIGS. 5 through 11.

*Exciter Circuit*

The exciter circuit is a relaxation oscillator which has for its active element a transistor $Q_1$. A relay E is connected in the collector circuit of transistor $Q_1$ and is operated by the collector current of this transistor. Bias of the transistor $Q_1$ is controlled by a transfer contact of relay E which comprises a break contact 1 and a make contact 2. The emitter of transistor $Q_1$ is connected to a power supply 50 through a diode 52, which is used to assure cutoff of the transistor by producing a fraction of a volt difference between the emitter and base thereof. A timing circuit comprising a resistor $R_1$ and a capacitor $C_1$ is connected in the exciter circuit with the capacitor connected between the base and collector of transistor $Q_1$ and the resistor $R_1$ connected between the base of transistor $Q_1$ and the transfer contact of relay E. The end of resistor $R_1$ that is remote from the base of transistor $Q_1$ is connected to ground through a contact of one of the alarm relays B, S, AC or F which are located in the preference network. When the power is first applied to transistor $Q_1$ the ground appearing on one side of resistor $R_1$ causes transistor $Q_1$ to conduct, thereby operating relay E. The operation of relay E connects the base of the transistor to power supply 50 through make contact 2 of relay E and the charging resistor $R_1$. Capacitor $C_1$ will now charge through the resistor $R_1$ and relay E, thereby causing the base of the transistor to become more negative until the current through relay E is reduced below the release value. This causes the relay to release which grounds resistor $R_1$ through break contact 1 of relay E and starts the discharge of capacitor $C_1$. When the capacitor has sufficiently discharged, the base of the transistor again reaches a bias potential at which the collector current of the transistor is sufficient to cause the operation of relay E. Here the cycle begins again.

*Preference and Symmetric Check Network*

The preference and symmetric check networks are made up of five alarm relays AC, F, B, D, and S and their associated contacts. The alarm relays are interconnected in the preference circuit to give priority to the alarms in a chosen order of importance. Each relay is connected to the power supply 50 through a contact of at least one other alarm relay except for the AC alarm relay which will be associated with the alarm of highest priority. Therefore, the preference network gives priority to the alarm relays in the order they are shown from top to bottom. The alarm of greatest importance has been selected to be either AC power failure or the failure of the two top tower lights. The selected alarm next in importance is the flasher circuit which causes the two top lights to flash on and off repetitively. The alarm that is third in priority has been selected to be low battery voltage which would indicate to the attendant at the alarm center that the standby power supply at the unattended station has a limited life. The alarm of fourth priority is selected to be transmission path failure or diversity switch failure. The alarm of lowest priority is side light failure.

It should be noted that the alarm relays F, B, and D must be in their inactive state before an alarm of lower priority can be registered since the alarm relays of lower priority are activated through a break contact of these relays F, B and D. Additionally, it should be noted that the alarm relay AC must be in its active state before any of the lower priority alarm relays may become active through make contact 1 of alarm relay AC. This condition is only illustrative of how some alarm relays, where necessary, may indicate a trouble condition by their inactive state while others may indicate a trouble condition by their active state.

The symmetric check network, which is made up of contacts of the alarm relays, assures that if a trouble of higher priority occurs while another trouble still exists, a new alarm will be transmitted to the attended alarm center. It also enables an existing alarm of lower priority to register after one of higher priority clears out. These functions of the symmetric check network will be best understood by considering the sequence charts of FIGS. 5 through 11.

*Counter Circuit*

The counter is composed of four double winding relays K1 through K4. The upper terminals of all eight windings are connected to a power supply 50 through contacts of alarm relays F, AC, and S, which allow this voltage to be applied only when one of these relays is in the alarm state. Ground is applied to the lower terminals of the counter relay windings through contacts of exciter relay E and selected ones of the contacts of relays K1 through K4. The operation of the counter relays occurs in regular sequence at each operation or release of the exciter relay E so that after eight intervals of operate or release of relay E the counter will have completed one cycle.

*Coding Network*

The coding network is controlled by contacts on the alarm relays AC, F, B, D, and S and contacts of the counter circuit relays K1 through K4. There are five code networks provided and their functions will be described taking them in order of appearance from left to right.

It should be noted that all of the contacts in each vertical line or column are associated with the relay noted above each column.

Introduced by a make contact 3 of relay S is a combination of contacts of relays K1, K2 and K3, which breaks continuity during certain of the eight intervals of the counter circuit so that ground is selectively connected to coding relay C of the associated radio or repeater station through terminal *a* to produce a code of 1 short and 1 long to be heard by the attendant at the near-end central office.

No coding network is introduced by make contact 3 of alarm relay D so that a steady ground is applied to coding relay C thereby producing a continuous open in the bridging circuit of the associated radio or repeater station and the absence of interrogating tone at the attended station.

Introduced by a make contact 3 of alarm relay B is break contact 5 of exciter relay E. thus causing a periodic interruption in the ground path of coding relay C, so that a steady pulsating tone will be present at the attended near-end central office.

Introduced by make contact 3 of alarm relay F is a contact network involving counter relays K1, K2, K3 and K4. This network breaks continuity in the ground path of coding relay C so that the code transmitted to the near-end central office will be 2 shorts.

Introduced by a break contact 3 on alarm relay AC is a contact network involving counter relays K3 and K4 in parallel with break contact 6 of exciter relay E. This breaks continuity in the ground path of coding relay C during certain of the eight counter intervals so that the code transmitted to the near-end central office will be 3 shorts.

*Alarm Loop Continuity Control Circuit*

The alarm loop continuity control circuit controls the associated relay A, A', and A'' located at the respective radio or repeater stations, so that any failure in the monitored circuits will cause the alarm loop to open long enough for the alarm to register at the attended station.

The control circuit comprises relays, M, G, PR, SL, and T and their contacts interconnected to perform the desired functions. It should be noted that one terminal of each of the listed relays is connected directly to a source 50. The completion of a circuit for energization of the relays is through at least one contact of one of the other relays.

The ground connection to the other terminal of relay G to complete its energization path is through either a break contact 2 of relay PR to a terminal *y* in the symmetric check network or a break contact 2 of relay M to a terminal *z* in the symmetric check network.

The ground connection for relay M is through a make contact 3 of relay SL and, thereafter, through a self-locking circuit of a make contact 3 of relay M to terminal *z* in the symmetric check network.

Relay T has a ground connection applied to its other terminal through a make contact 2 of relay G. Relay SL has a ground connection applied to its other terminal to complete its energization path through a make contact 2 of relay T. Relay PR has its other terminal connected to ground through a make contact 2 of relay SL and a make contact 8 of relay AC or through a locking circuit of a make contact 3 of relay PR and make contact 8 of relay AC.

A break contact 1 of relay G is connected in the energization path of relay A, A', and A'' so that the action of these relays will be dependent upon relay G. This break contact 1 of relay G is connected between terminal *b* and ground in the encoder circuit.

*Over-all Operation of the Encoder*

For illustrative purposes, the encoder will be described more fully by reference to the sequence charts of FIGS. 5–11. It is to be noted that the selected alarms are in no way to be considered as the only alarms possible from the encoder circuit but are illustrative only.

When direct-current power is initially applied to the encoder circuit, a sequence of relay actions occurs before the encoder is ready to receive alarms. This sequence is shown in sequence chart SC1 of FIG. 5. Upon the application of the direct-current power supplied by source 50, relay AC will operate, assuming no alarm conditions exist when direct-current power is connected. Relay G will also operate at this time by receiving the ground appearing at terminal *y* of the symmetric check network through break contact 2 of relay PR. Operation of relay G will cause operation of relay T, which is a time delay relay having for illustrative purposes the selected time of delay of 80 seconds. Therefore, after approximately 80 seconds, relay SL will operate. Operation of relay SL will cause operation of relay PR because relay PR will receive ground through make contact 8 of relay AC and make contact 2 of relay SL. When relay PR operates relay G will release because it can no longer obtain ground through break contact 2 of relay PR. The release of relay G will cause the release of relay T and relay SL. Relay PR remains operated through its own make contact 3 and make contact 8 of relay AC. When this sequence is complete the circuit is in its normal state and is ready to receive alarms.

Figure 6:
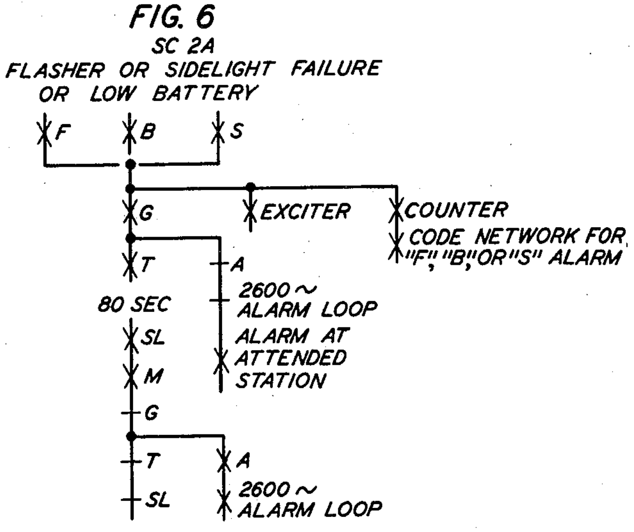

If it is assumed that one of the alarms of "flasher failure," "side light failure" or "low battery voltage" is present, the sequence of relay actions depicted in sequence chart SC2A of FIG. 6 will take place. Assume, for example, that there is a flasher failure. Alarm relay F will be activated which will operate the exciter and the counter by applying ground to the exciter through make contact 2 of relay F and voltage to the counter through make contact 4 of relay F. The proper code is determined by the coding network and in this case is selected by the closing of make contact 3 of relay F in the coding network. Relay G is also operated at this time by the ground that appears at terminal *z* of the symmetric check network. This ground is applied to relay G through break contact 2 of relay M which is in its inactive state. When relay G is operated, ground is removed from relay A by the opening of break contact 1 of relay G, thus opening the alarm loop and effectuating an alarm at the attended station. Operation of relay G operates relay T and after the selected 80 second delay relay SL is operated. Operation of relay SL connects the ground at terminal z of the symmetric check network to relay M through make contact 3 of relay SL. Relay M will now operate causing the removal of ground from relay G and the locking of relay M to the ground through its own make contact 3. When relay G is released, the ground is again applied to relay A, thereby restoring the alarm loop. Additionally, the release of relay G causes the release of relay T, which in turn releases relay SL. The circuit will remain in this state with relay M locked to the ground appearing at terminal z of the symmetric check network until there is a change in alarm status. During this time, coding relay C is operative through the coding network making code transmission continuous as long as the interrogation tone associated with this particular unattended station is applied to the alarm loop.

Figures 7, 11:
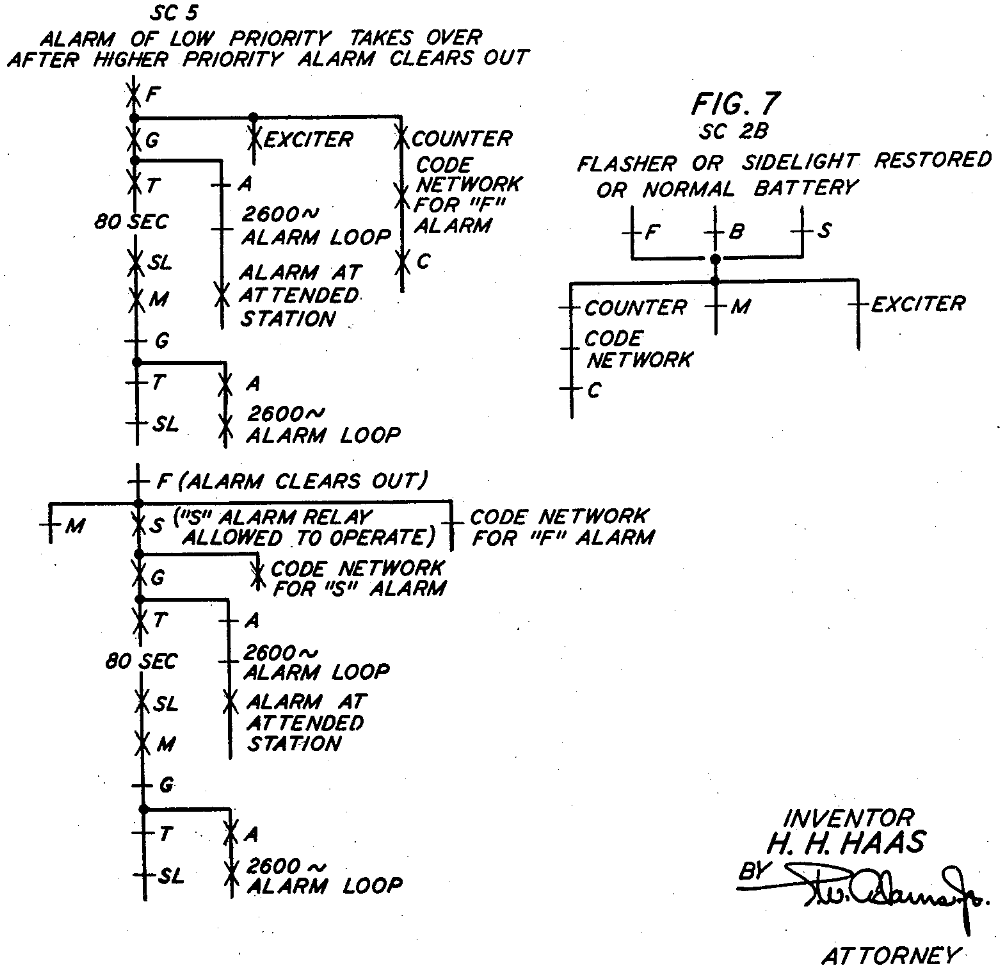

When the alarm associated with relays F, B, or S clears out, the sequence of actions that will take place is shown in sequence chart SC2B of FIG. 7. Assuming that alarm relay F had been activated and the alarm condition is now removed, relay F will open, thereby removing the ground from terminal z in the symmetric check network that was applied through make contact 5 of relay F and make contact 6 of relay AC. The removal of this ground from terminal z causes relay M to release. Additionally, upon the release of relay F, ground is removed from the exciter circuit by the opening of make contact 2 of relay F and voltage is removed from the counter circuit by the opening of make contact 4 of relay F, thereby halting the transmission of code.

Figures 8, 9, 10:
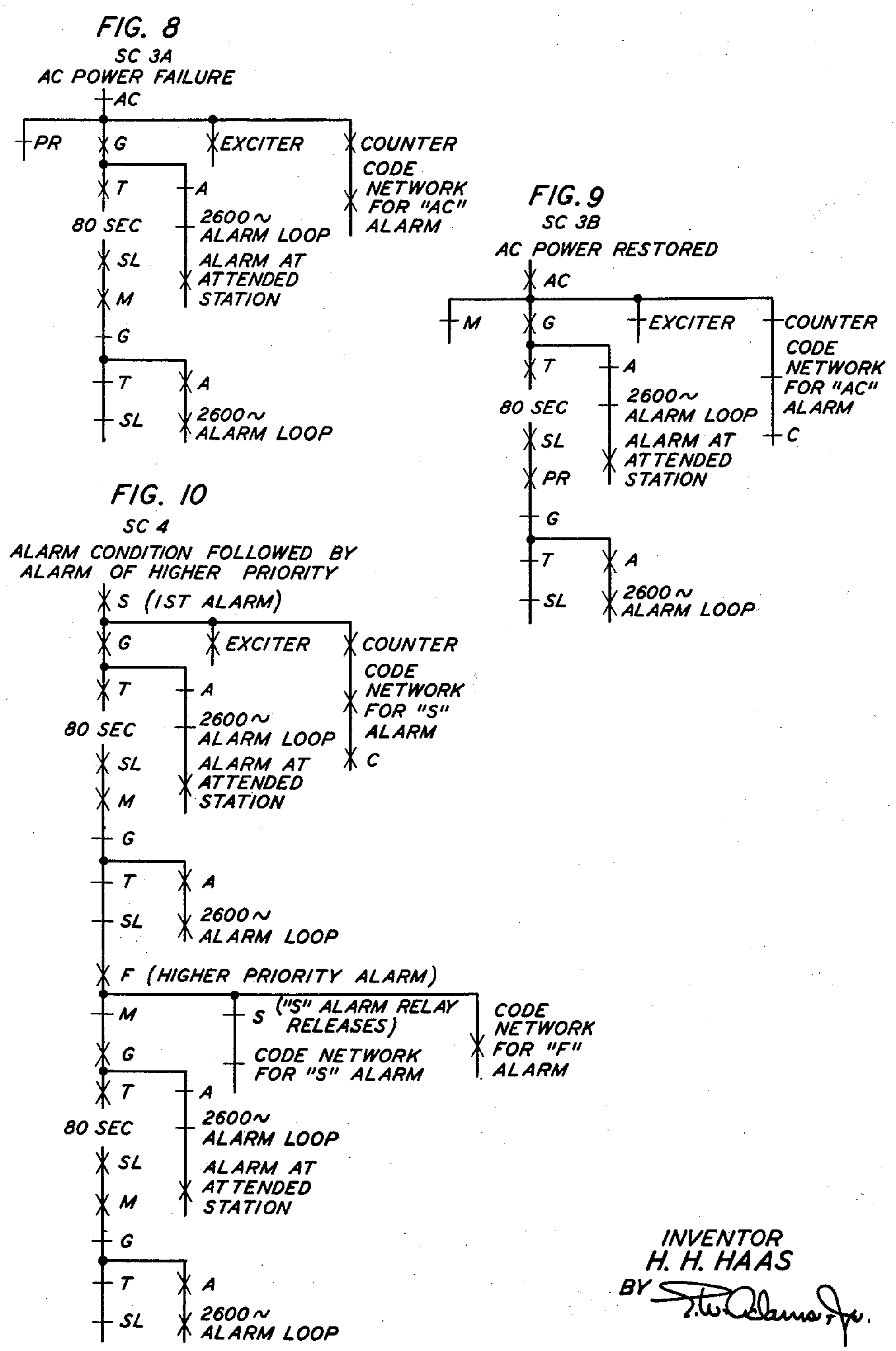

The sequence of relay actions for an "alternating-current power" or "two top tower lights" failure depicted in sequence chart SC3A of FIG. 8 is the same as the sequence shown in SC2A (FIG. 6) with the exception that relay PR releases because of the opening of make contact 8 of relay AC. It is to be noted that the sequence of events for the alternating-current power failure alarm is made different so that, upon the restoration of power an attendant at the alarm center will be alerted. The way that the attendant is alerted can be seen by referring to sequence chart SC3B of FIG. 9, which shows the sequence of action when the alternating-current power is restored. When the A.C. power failure clears out, relay M releases and the exciter and counter are de-energized just as they were when alarm relays F, S, or B cleared out. The difference in this sequence is that relay G is allowed to operate from the ground that it receives through the break contact 2 of relay PR which had been de-energized when the A.C. power failure occurred. As in the other sequences, operation of relay G breaks the alarm loop and causes an alarm at the attended station. Additionally, relay T is operated and in turn relay SL. Operation of relay SL locks relay PR to ground through make contact 8 of relay AC and make contact 3 of relay PR. Operation of relay PR releases relay G, which releases relays T and SL and also activates relay A, thereby returning the circuit to its normal state.

When there is only a single alarm loop, such as the one utilized here, it becomes necessary to realarm the attended station upon the occurrence of an alarm of higher priority when an alarm already exists. This condition will generally be described with reference to sequence chart SC4 of FIG. 10, where it is assumed that alarm relay S is operated and the higher priority alarm relay F is subsequently operated. It is noted that any two alarm conditions where an existing alarm is followed by the onset of another alarm of higher rank could have been used.

The operation of the circuit for alarm S follows the sequence shown in sequence chart SC2A (FIG. 6). When relay F operates, as shown in SC4 of FIG. 10, it releases relay S through its break contact 1 located in the preference circuit. The alarm relays are chosen to be slow-operate, slow-release relays. Therefore, for a period of time both relays F and S are in their operated condition. During this period of time no ground is present at terminal z in the symmetric check network and relay M is allowed to release. The release of relay M returns the circuit to its normal condition and it is ready to receive alarm F in its normal manner.

Additionally, in an alarm system having a single alarm loop, it is necessary to provide a realarming of the attended station when two alarm conditions are present at the same time and the one of higher priority clears out. The sequence of relay actions shown in sequence chart SC6 of FIG. 11 is illustrative of this circuit condition. Alarms F and S are again used to illustrate this sequence, although any two alarm conditions, where the one of higher priority clears first, could be used. The operation of alarm relay F causes the same sequence as described in sequence chart SC2A (FIG. 6). If, during the period that alarm relay F is activated and if there is a side light failure, alarm relay S will not operate because of the break contact 1 of relay F in the preference circuit. Assuming that alarm F condition clears out and the side light failure remains, the following will happen: releasing of relay F will allow relay S to operate but for a period of time equal to the operate time of relay S there will be no alarm relay in the preference network operated. During this time relay M will release because no ground is present at terminal z in the symmetric check network. The release of relay M restores the circuit to its normal condition and alarm relay S causes the normal sequence for this alarm.

What is claimed is:

1. In a communication system comprising a main station and a plurality of subsidiary stations, an alarm signaling channel forming a loop linking all of said stations, transmitting means at said main station for impressing a first signal to said loop, means at said main station for receiving said signal over said loop, means at each subsidiary station for interrupting said loop in the event of trouble at the respective station, additional means at said main station for selectively applying to said loop signals having different frequencies individual to said subsidiary stations, means at each subsidiary station bridging said loop for only the signal individual to that station, means for interrupting said bridging means to produce codes associated with particular trouble conditions of differing ranks of importance, means at each subsidiary station for recognizing the trouble condition of highest rank where a plurality of troubles exist concurrently so that only one code is generated at a time, means for alerting an attendant at said main station of any change in code signal and trouble condition, and means for informing said attendant of the clearing of selected ones of the trouble conditions.

2. In a communication system comprising a main station and a plurality of subsidiary stations, an alarm signaling channel forming a loop linking all of said stations, transmitting means at said main station for impressing a first signal upon said loop, means at said main station for receiving said signal over said loop, means at each subsidiary station for interrupting said loop in the event of trouble at the respective station, additional means at said main station for selectively applying to said loop signals having different frequencies individual to said subsidiary stations, means at each subsidiary station bridging said loop for only the signal individual to that station, and additional means at each subsidiary station which has a plurality of possible trouble conditions for controlling the continuity through respective bridging means of the subsidiary stations, said controlling means including means for interrupting said bridging means, means for giving precedence to trouble conditions of selected highest priority, means for counting intervals of time, means for pulsing said counting means to establish said intervals of time, means associated with said counting means for activating said interrupting means during certain ones of said intervals of time to produce a predetermined code associated with a particular trouble condition, and means for interrupting said loop whenever a trouble of higher priority occurs.

3. In a communication system comprising a main station and a plurality of subsidiary stations, an alarm signaling channel forming a loop linking all of said stations, transmitting means at said main station for impressing a first signal upon said loop, means at said main station for receiving said signal over said loop, means at each subsidiary station for interrupting said loop in the event of trouble at the respective station, additional means at said main station for selectively applying to said loop signals having different frequencies individual to said subsidiary stations, means at each subsidiary station bridging said loop for only the signal individual to that station, and additional means at each subsidiary station which has a plurality of possible trouble conditions for controlling the continuity through respective bridging means of the subsidiary stations, said controlling means including means for interrupting said bridging means, means for giving precedence to trouble conditions of selected highest priority, means for counting intervals of time, means for pulsing said counting means to establish said intervals of time, means associated with said counting means for activating said interrupting means during certain ones of said intervals of time to produce a predetermined code associated with a particular trouble condition, and means for interrupting said loop whenever a trouble of higher priority clears while a trouble of lower priority exists.

4. In a communication system comprising a main station and a plurality of subsidiary stations, an alarm signaling channel forming a loop linking all of said stations, transmitting means at said main station for impressing a first signal upon said loop, means at said main station for receiving said signal over said loop, means at each subsidiary station for interrupting said loop in the event of trouble at the respective station, additional means at said main station for selectively applying to said loop signals having different frequencies individual to said subsidiary stations, means at each subsidiary station bridging said loop for only the signal individual to that station, and additional means at each subsidiary station which has a plurality of possible trouble conditions for controlling the continuity through respective bridging means of the subsidiary stations, said controlling means including means for interrupting said bridging means, means for giving precedence to trouble conditions of selected highest priority, means for counting intervals of time, means for pulsing said counting means to establish said intervals of time, means associated with said counting means for activating said interrupting means during certain ones of said intervals of time to produce a predetermined code associated with a particular trouble condition, and means for interrupting said loop whenever certain selected troubles clear out.

References Cited in the file of this patent

UNITED STATES PATENTS

| | | |
|---|---|---|
| 2,315,435 | Liebe | Mar. 30, 1943 |
| 2,580,757 | Germanton | Jan. 1, 1952 |
| 2,584,857 | Frankel | Feb. 5, 1952 |
| 2,719,284 | Roberts | Sept. 27, 1955 |
| 2,840,797 | Derr | June 24, 1958 |
| 2,892,895 | Abbott | June 30, 1959 |
| 2,980,898 | Mason et al. | Apr. 18, 1961 |

FOREIGN PATENTS

| | | |
|---|---|---|
| 821,631 | Great Britain | Oct. 14, 1959 |